(12) United States Patent
Yuan et al.

(10) Patent No.: US 12,377,476 B2
(45) Date of Patent: Aug. 5, 2025

(54) MICRO-CAVITY LIQUID-PHASE SHEARING DEVICE FOR PREPARING QUASI-TWO-DIMENSIONAL MATERIALS

(71) Applicant: Nantong University, Jiangsu (CN)

(72) Inventors: Guoqiu Yuan, Jiangsu (CN); Yamei Mo, Jiangsu (CN); Min Cao, Jiangsu (CN); Chonggui Zhong, Jiangsu (CN); Dexin Liu, Jiangsu (CN); Chunyan Jiang, Jiangsu (CN)

(73) Assignee: Nantong University, Jiangsu (CN)

( * ) Notice: Subject to any disclaimer, the term of this patent is extended or adjusted under 35 U.S.C. 154(b) by 581 days.

(21) Appl. No.: 17/871,802

(22) Filed: Jul. 22, 2022

(65) Prior Publication Data

US 2022/0362866 A1 Nov. 17, 2022

Related U.S. Application Data

(63) Continuation of application No. PCT/CN2020/138160, filed on Dec. 22, 2020.

(51) Int. Cl.
*B23D 15/14* (2006.01)
*B23D 33/02* (2006.01)
*C01B 32/19* (2017.01)

(52) U.S. Cl.
CPC .............. *B23D 15/14* (2013.01); *B23D 33/02* (2013.01); *C01B 32/19* (2017.08)

(58) Field of Classification Search
CPC ........ B23D 15/14; B23D 33/02; C01B 32/19; C01B 33/18; C01B 31/0469; H05K 9/0081; C01P 2004/80; H01B 1/02

USPC ............ 83/673; 252/506; 423/448; 428/220; 977/737, 937, 842
See application file for complete search history.

(56) References Cited

U.S. PATENT DOCUMENTS 9,206,051 B2 * 12/2015 Murray ................. B02C 17/186
2004/0023779 A1 * 2/2004 Ogino ................. B01D 17/0217
494/22

FOREIGN PATENT DOCUMENTS

| CN | 1631482 A | * | 6/2005 | ............. C01G 39/06 |
| CN | 107364849 A | * | 11/2017 | ............. C01G 39/06 |
| CN | 112142041 A | * | 12/2020 | ............. C01G 39/06 |
| WO | WO-2022235710 A1 | * | 11/2022 | ............. B01F 31/40 |

* cited by examiner

*Primary Examiner* — Ghassem Alie

(57) ABSTRACT

A micro-cavity liquid-phase shearing device for preparing quasi-two-dimensional materials includes a movable plate system, a fixed plate system, a feed liquid external circulation system, a driven gear system and a charging barrel. The movable plate system includes a movable plate unit and a driving gear. The fixed plate system includes a fixed plate unit and a support. A tank of the movable plate unit has a primary shear cavity, an annular micro-gap between a movable plate of the movable plate unit and a fixed plate of the fixed plate unit is defined as a secondary shear micro-cavity. The feed liquid, which flows outside the feed pipe through the liquid discharge port thereof, is primarily sheared in the primary shear cavity by the movable plate system, and then is secondarily sheared in the secondary shear micro-cavity by the movable plate and the fixed plate, and then returns to the charging barrel.

10 Claims, 4 Drawing Sheets

III-III

IV-IV

MICRO-CAVITY LIQUID-PHASE SHEARING DEVICE FOR PREPARING QUASI-TWO-DIMENSIONAL MATERIALS

CROSS REFERENCE OF RELATED APPLICATION

This is a Continuation Application of the International Application PCT/CN2020/138160, filed on Dec. 22, 2020.

BACKGROUND OF THE PRESENT INVENTION

Field of Invention

The present invention relates to a liquid-phase shearing device, and more particularly to a micro-cavity liquid-phase shearing device for preparing quasi-two-dimensional materials.

Description of Related Arts

In recent years, two-dimensional materials have shown great application potential in the fields of optical communication, photoelectric detection, electrode materials, water treatment, and photo (electro) catalysis, and have also become a research hotspot around the world. Similar to the traditional preparation of nanomaterials, the present invention also adopts two preparation strategies of "top-to-bottom" and "bottom-to-top", and correspondingly, there are two types of methods, physical preparation and chemical preparation both of which have all been successful in laboratory studies. However, different from laboratory studies that only require a small amount of samples, practical applications require large-scale, economical and environmentally friendly preparation techniques and devices. It is noted that the interlaminar bonding of layered materials is stable while the interlaminar bonding depends on weaker van der Waals forces. Therefore, at present, one of the most promising preparation paths for mass production is to take layered material as the precursor and realize the interlaminar exfoliating of layered material through physical grinding or shearing. However, the current common liquid-phase sanding and rubber-grinding technologies are unable to achieve effective interlaminar exfoliating of layered materials due to their technical characteristics. Sand mills generally adopt a closed-cavity design, which use an eccentric disc mounted on a stirring shaft to drive the mixture of materials and grinding media (which usually are glass balls or ceramic oxide pellets) for efficient relative motion to achieve effective dispersion of material solid particles. The colloid mill adopts a structure in which a rotor with external helical teeth is coaxially set with a stator with internal helical teeth. The rotor is driven by the motor to move relative to the stator. The materials pass through the narrow gap between the tooth helical surface of the rotor and that of the stator, and are rubbed to produce shearing effect, thereby achieving refinement of materials.

In practical applications, whether it is sand grinding or glue grinding, the shear effect mainly depends on the shear force of solid materials. According to hydrodynamics, the shear force in the liquid phase is related to the velocity gradient, which is expressed by a formula of $$\tau = \eta \frac{dv}{dx},$$

wherein $\tau$ represents the shear force, $\eta$ represents viscosity coefficient of multi-phase fluid, $$\frac{dv}{dx}$$

is velocity gradient of solid-phase material relative surfaces. According to the boundary layer theory, the movement of multi-phase fluid comes from the rotation of the mixing shaft of the sand mill or the actuator of the glue mill. The higher the rotational speed, the more likely it is to produce a large velocity gradient. However, the structure of the eccentric disc and the fragile grinding medium ball of the sand mill limit the speed (which is generally less than 3000 rpm) of the mixing shaft, which affects the shear effect between the materials and the grinding media, the discharging size of solid particles is generally on the order of micron. The glue mill makes use of the micro-gap between the rotor and the stator to increase the velocity gradient, which realizes higher refinement than sand mill. However, the helical tooth structure of the rotor restricts the high-speed dynamic balance thereof, the rotational speed of the rotor is limited (the rotational speed is not more than 4000 rpm), and the glue mill is not easy to achieve the effect of material nanocrystallization. Moreover, the friction reaction of materials to the rotor and the stator will increase the gap between the rotor and the stator, and reduce the refinement effect.

In fact, high rotational speed and micro-gap are effective means to improve the shear force of liquid phase. Theoretical studies show that graphene is able to be prepared by interlayer exfoliation of flake graphite under the conditions of rotational speed of 10000 rpm and shear spacing of 40 μm. However, at present, the device with rotational speed of more than 10000 rpm and shear spacing of tens of microns has not been developed.

SUMMARY OF THE PRESENT INVENTION

A technical problem to be solved of the present invention is to provide a micro-cavity liquid-phase shearing device for preparing quasi-two-dimensional materials, in which a movable plate system and a fixed plate form a micro-cavity structure to ensure the near laminar movement of multi-phase fluids, and moreover, the capacitance micro-ranging devices are in combination with the precision differential screw devices to set the reasonable micro-gap for different materials.

To solve the above technical problem, the present invention provides a micro-cavity liquid-phase shearing device for preparing quasi-two-dimensional materials, which comprises a movable plate system, a fixed plate system, a feed liquid external circulation system, a driven gear system and a charging barrel, wherein:

a feed liquid is provided within the charging barrel;

the movable plate system comprises a movable plate unit and a driving gear;

the driven gear system comprises multiple driven gears;

the movable plate unit, which is provided within the charging barrel, comprises a tank and a movable plate around an opening of the tank;

the driving gear is installed within the tank through a driving shaft, the driven gears are engaged with an external side of the driving gear, a lower end of the driving shaft is connected with a power machine, the movable plate unit is fixedly connected with the driving shaft, the driving shaft drives the driving gear and the movable plate unit to rotate;

the fixed plate system comprises a fixed plate unit and a support, wherein the support is installed above the charging barrel, the fixed plate unit is provided under the support, the fixed plate unit comprises an annular fixed plate which is provided above the movable plate in parallel;

the feed liquid external circulation system comprises a microfluidic pump, a discharge pipe and a feed pipe, wherein two ends of the discharge pipe are connected with a liquid discharge port of the charging barrel and a liquid feed port of the microfluidic pump, one end of the feed pipe is connected with a liquid discharge port of the microfluidic pump, another end of the feed pipe is provided above the driving gear;

the tank has a primary shear cavity, an annular micro-gap between the movable plate and the fixed plate is defined as a secondary shear micro-cavity;

the feed liquid, which flows outside the feed pipe through the liquid discharge port thereof, is primarily sheared in the primary shear cavity by the movable plate system, and then is secondarily sheared in the secondary shear micro-cavity by the movable plate and the fixed plate, and then returns to the charging barrel.

Preferably, the fixed plate system further comprises an annular micro-gap adjustment device which comprises multiple fasten screws and multiple precision differential screw devices, wherein two ends of the annular fixed plate after being upwardly bent are connected with the support through the multiple circumferentially evenly distributed fasten screws, upper ends of the multiple fasten screws extend outside the support and are connected with the precision differential screw devices respectively.

Preferably, multiple capacitance micro-ranging devices are inserted into an lower end surface of the annular fixed plate.

Preferably, the multiple capacitance micro-ranging devices are circumferentially evenly distributed at the fixed plate.

Preferably, three circumferentially evenly distributed driven gears are engaged with the external side of the driving gear.

Preferably, the three driven gears are sleeved on a lower end of three driven shafts respectively, the three driven shafts are limited to the support through bearings.

Preferably, the power machine is a high-speed motor, the lower end of the driving shaft extends outside a bottom of the charging barrel and is connected with a motor shaft of the high-speed motor.

Preferably, a protruding portion is at the bottom of the charging barrel, and a bearing support is provided between the driving shaft and a side wall of the protruding portion.

Preferably, the support is fixedly connected with an upper end of the charging barrel through a fixing bolt set.

The present invention has some beneficial effects as follows.

(1) According to the present invention, the movable plate system is centrosymmetric, so it is uniform in mass distribution for maintaining the dynamic balance during high-speed rotation, which provides large linear velocity and velocity gradient for the secondary shearing in the far-shaft working area, thereby ensuring high shearing efficiency in the far-shaft working area. At the same time, the gear mesh of the primary shearing combines the shearing advantages of the sand mill and the rubber mill, so that the high-speed drive improves the shearing efficiency, and the gear mesh transmission avoids the reduction of shearing effect caused by the increase of clearance from wear in the rubber mill.

(2) According to the present invention, the micro-cavity structure, formed by the movable plate system and the fixed plate system, ensures the near-laminar motion form of the multi-phase fluid, and the capacitance micro-ranging devices are in combination with the precision differential screw devices to set the reasonable micro-gap for different materials.

(3) According to the present invention, the material feeding and discharging of the external circulation are able to effectively control the temperature rise of the multi-phase fluid. On the one hand, the change of the material phase caused by the temperature rise is avoided; on the other hand, the adverse effects, such as the decreased viscosity and the poor shear efficiency of the multi-phase fluid caused by temperature increase, are also avoided.

Figure 1:
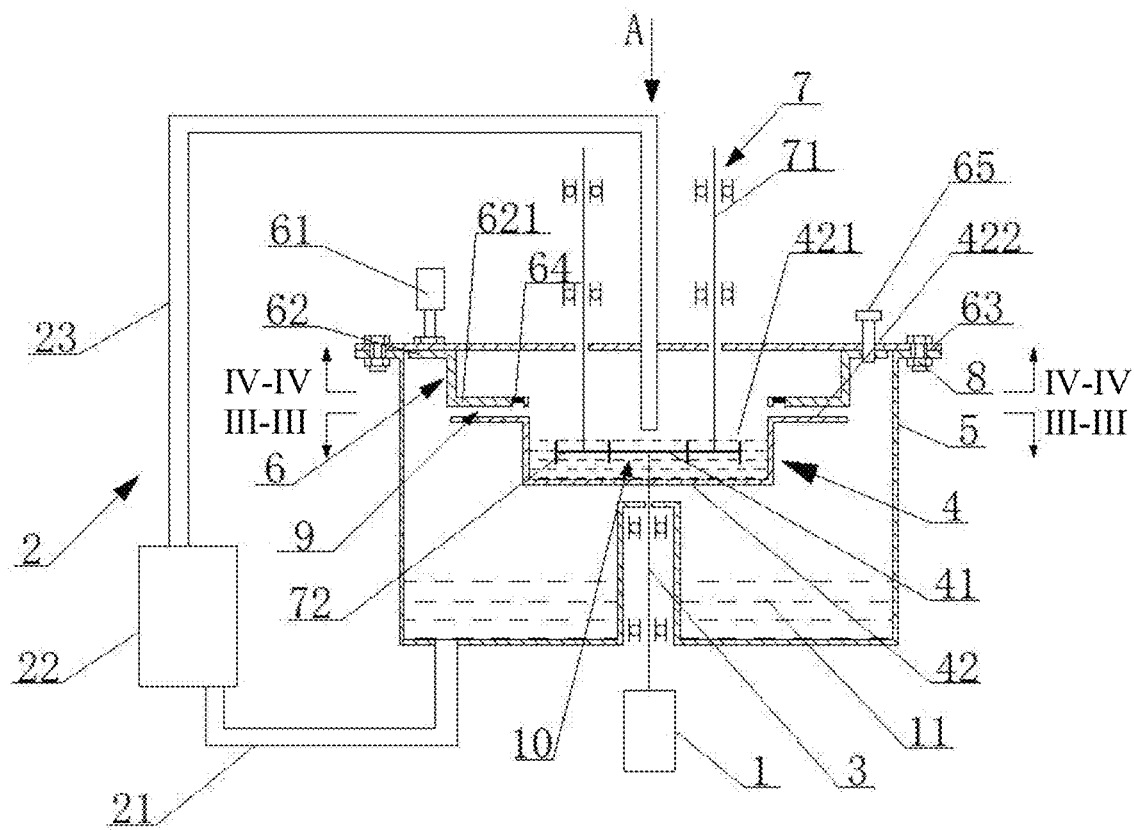
FIG. 1 is a structural schematic diagram of a micro-cavity liquid-phase shearing device for preparing quasi-two-dimensional materials according to a preferred embodiment of the present invention.
Figure 2:
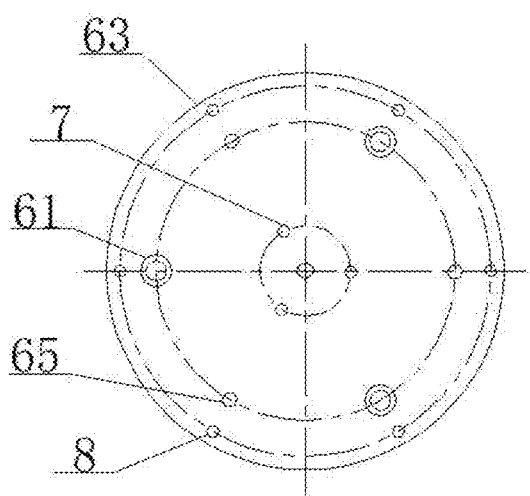
FIG. 2 is a schematic diagram along the A-direction in FIG. 1.
Figure 3:
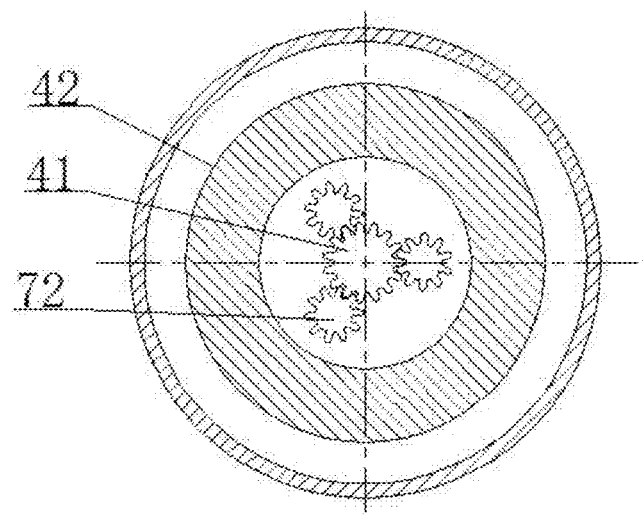
FIG. 3 is a sectional view along the direction in FIG. 1.
Figure 4:
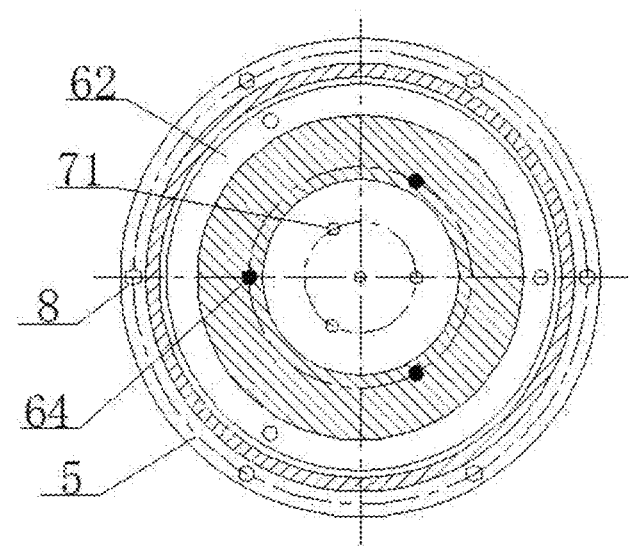
FIG. 4 is a sectional view along the Iv-Iv direction in FIG. 1.

In the drawings, 1: high-speed motor; 2: feed liquid external circulation system; 21: discharge pipe; 22: microfluidic pump; 23: feed pipe; 3: driving shaft; 4: movable plate system; 41: driving gear; 42: movable plate unit; 421: tank; 422: movable plate; 5: charging barrel; 6: fixed plate system; 61: precision differential screw device; 62: fixed plate unit; 621: fixed plate; 63: support; 64: capacitance micro-ranging device; 65: fasten screw; 7: driven gear system; 71: driven shaft; 72: driven gear; 8: fixed bolt set; 9: far-shaft working area; 10: near-shaft working area; 11: feed liquid.

DETAILED DESCRIPTION OF THE PREFERRED EMBODIMENT

In order to make the technical problems to be solved, technical solutions and advantages of the present invention clearer, the present invention is further explained in detail with reference to the accompanying drawings and specific embodiments as follows.

Referring to FIGS. 1 to 4, a micro-cavity liquid-phase shearing device for preparing quasi-two-dimensional materials according to a preferred embodiment of the present invention is illustrated, which comprises a movable plate system 4, a fixed plate system 6, a feed liquid external circulation system 2, a driven gear system 7 and a charging barrel 5, wherein a feed liquid 11 is provided within the charging barrel 5, the movable plate system 4 comprises a movable plate unit 42 and a driving gear 41, the movable plate unit 42 is provided within the charging barrel 5, the movable plate unit 42 comprises a tank 421 and a movable plate 422 around an opening of the tank 421, the driving gear 41 is installed within the tank 421 through a driving shaft 3, a lower end of the driving shaft 3 is connected with a power machine for the driving gear, the movable plate unit 42 is fixedly connected with the driving shaft 3, the driving shaft 3 drives the driving gear 41 and the movable plate unit 42 to rotate.

The power machine for the driving gear is embodied as a high-speed motor 1 with a rotating speed in a range of 7000 to 12000 rmp, the lower end of the driving shaft 3 extends outside a bottom of the charging barrel 5 and is connected with a motor shaft of the high-speed motor 1.

According to the preferred embodiment of the present invention, a protruding portion is provided at the bottom of the charging barrel 5, and a bearing support is provided between the driving shaft 3 and a side wall of the protruding portion.

Referring to FIG. 1, based on a distance away from an upper end of the driving shaft 3, there are two areas, that is, a near-shaft area and a far-shaft area both of which are in combination with the movable plate system and the fixed plate system to form a near-shaft working area 10 and a far-shaft working area 9 respectively.

The fixed plate system 6 comprises a fixed plate unit 62 and a support 63, wherein the support 63 is fixedly connected with an upper end of the charging barrel 5 through a fixing bolt set 8, the fixed plate unit 62 is provided under the support 63, the fixed plate unit 62 comprises an annular fixed plate 621 which is provided above the movable plate 422 in parallel, an annular micro-gap between the movable plate 422 and the annular fixed plate 621 is defined as a secondary shear micro-cavity which is able to confine the fluid in a near-laminar state, the far-shaft area of the movable plate system has a large linear velocity for effectively obtaining a large velocity gradient in the secondary shear micro-cavity, thereby realizing secondary shearing.

The fixed plate system 6 further comprises an annular micro-gap adjustment device which comprises multiple fasten screws 65 and multiple precision differential screw devices 61, wherein two ends of the annular fixed plate 621 after being upwardly bent are connected with the support 63 through the multiple circumferentially evenly distributed fasten screws 65, upper ends of the multiple fasten screws 65 extend outside the support 63 and are connected with the precision differential screw devices 61 respectively, three circumferentially evenly distributed capacitance micro-ranging devices 64 are inserted into an lower end surface of the annular fixed plate 621. The annular micro-gap between the movable plate 422 and the fixed plate 621, and a depth of parallelism between the movable plate 422 and the fixed plate 621 are able to be adjusted through the capacitance micro-ranging devices 64 and the precision differential screw devices 61, so as to achieve precise settings at the micron level.

The feed liquid external circulation system 2 comprises a microfluidic pump 22, a discharge pipe 21 and a feed pipe 23, wherein two ends of the discharge pipe 21 are connected with a liquid discharge port of the charging barrel 5 and a liquid feed port of the microfluidic pump 22, one end of the feed pipe 23 is connected with a liquid discharge port of the microfluidic pump 22, another end of the feed pipe 23 is provided above the driving gear 41. Through the microfluidic pump 22 of the feed liquid external circulation system 2, the multi-phase liquid (namely, the feed liquid 11) containing materials in the charging barrel 5 passes through the feed pipe 23 and enters the near-shaft working area 10 for completing the primary shearing, and then enters the far-shaft working area 9 under an under an action of centrifugal force for completing the secondary shearing, and then flows out from a shear working end of the far-shaft working area 9 and returns to the charging barrel 5, thereby achieving the cyclic shearing of the feed liquid 11.

The driven gear system 7 comprises three driven shafts 71 and three driven gears 72, wherein the three driven gears 72 are sleeved on a lower end of the three driven shafts 71 respectively, the three driven shafts 71 are limited to the support 63 through bearings. The three circumferentially evenly distributed driven gears 72 are engaged with an external side of the driving gear 41 to form a primary shearing system, so that on the one hand, it has a similar sanding-like effect on the precursor to complete the primary shearing; on the other hand, the multi-phase fluid is stirred for evenly mixing, thereby achieving the purpose of uniform preparation.

The tank 421 has a primary shear cavity, the annular micro-gap between the movable plate 422 and the fixed plate 621 is defined as the secondary shear micro-cavity. The feed liquid 11, which flows outside the feed pipe 23 through the liquid discharge port thereof, is primarily sheared in the primary shear cavity by the movable plate system 4, and then is secondarily sheared in the secondary shear micro-cavity by the movable plate 422 and the fixed plate 621, and then returns to the charging barrel 5.

The working principle of the micro-cavity liquid-phase shearing device provided by the present invention is described as follows. Before working, the annular micro-gap is firstly adjusted as required. The adjustment principle of the annular micro-gap between the movable plate and the fixed plate, and the control principle of the depth of parallelism between the movable plate and the fixed plate are as follows. The axial working position of the movable plate unit is fixed, the fixed plate unit is connected with the support by the three circumferentially evenly distributed fasten screws, and the three circumferentially evenly distributed precision differential screw devices are fixedly connected with the support. Through tightening or loosening the fasten screws, the fixed plate unit and the support are tightened or loosened. When the fasten screws are tightened, the fixed plate unit is driven to move upwardly and reaches a top position while being tightened with the support, and at this time, the micro-gap between the fixed plate and the movable plate reaches a maximum; when the fasten screws are loosened, the fixed plate unit is separated from the support, and at this time, an end portion of the precision differential screw devices is against the fixed plate unit to drive the fixed plate unit to move downwardly relative to the support, thus achieving the purpose of adjusting the micro-gap between the movable plate and the fixed plate. The three capacitance micro-ranging devices are provided at a lower end of the fixed plate and are circumferentially evenly distributed for precisely measuring the micro-gap and simultaneously reflecting the level of the lower end face of the fixed plate. During the specific operation, through the feedback of the measurement value of the capacitance micro-ranging devices, the rotation amount of the three precision differential screw devices is controlled, so as to control the micro-gap between the movable plate and the fixed plate, and the parallelism of the two plates to be at the micron level. When the liquid flows through the micro-gap between the movable plate and the fixed plate, the shear force generated inside the liquid performs the secondary shearing on the layered precursor in the liquid for exfoliating the layered precursor into a two-dimensional material.

The technical solutions of the present invention is further described in combination with embodiments as follows.

The micro-gap liquid-phase shearing device provided by the present invention is able to achieve the interlaminar exfoliating of bulk layered materials. As an example of applying the device, liquid-phase shearing of commercially available 500-mesh flake graphite is carried out by using this device.

The graphite powders are mostly flake graphite with a thickness of micrometers. The typical liquid-phase shearing process of the flake graphite comprises steps of:

(1) dispersing 2 g of graphite powders in 200 ml of mixed solution of hydrogen peroxide and a first amount of deionized water, wherein a volume ratio of hydrogen peroxide and the first amount of deionized water is 1:1, adjusting a pH value of the mixed solution containing the graphite powders to 1 with HCl, and forming a suspension by magnetic stirring at room temperature for 2 hours at a stirring speed of 600 rmp;

(2) shearing the suspension by a micro-cavity liquid-phase shearing device at a shearing speed of 9000 rmp for 10 times, wherein a micro-gap of the micro-cavity liquid-phase shearing device is 40 µm; and (3) centrifuging the sheared suspension, washing a centrifuged product with a second amount of deionized water until the centrifuged product is neutral, moving to a vacuum oven at 60° C. after centrifuging a washed product at a centrifugal speed of 5000 rpm, and drying for obtaining a final product with a weight of 1.406 g.

Figure 5:
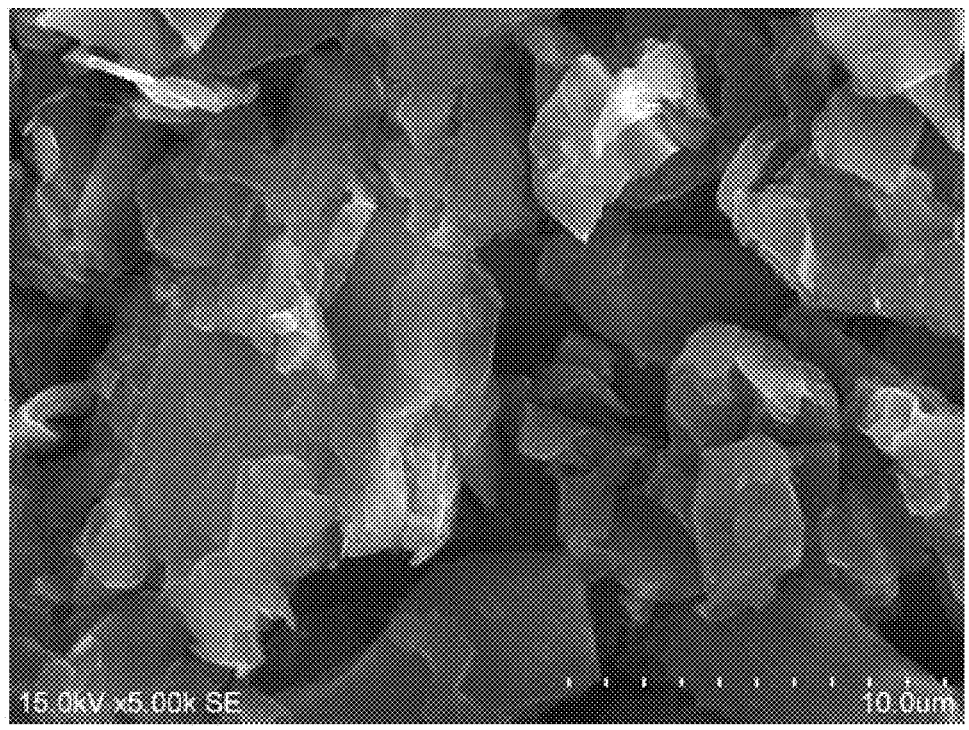
FIG. 5 shows the SEM (scanning electron microscope) characterization of 500-mesh graphite powders provided by the present invention.
Figure 6:
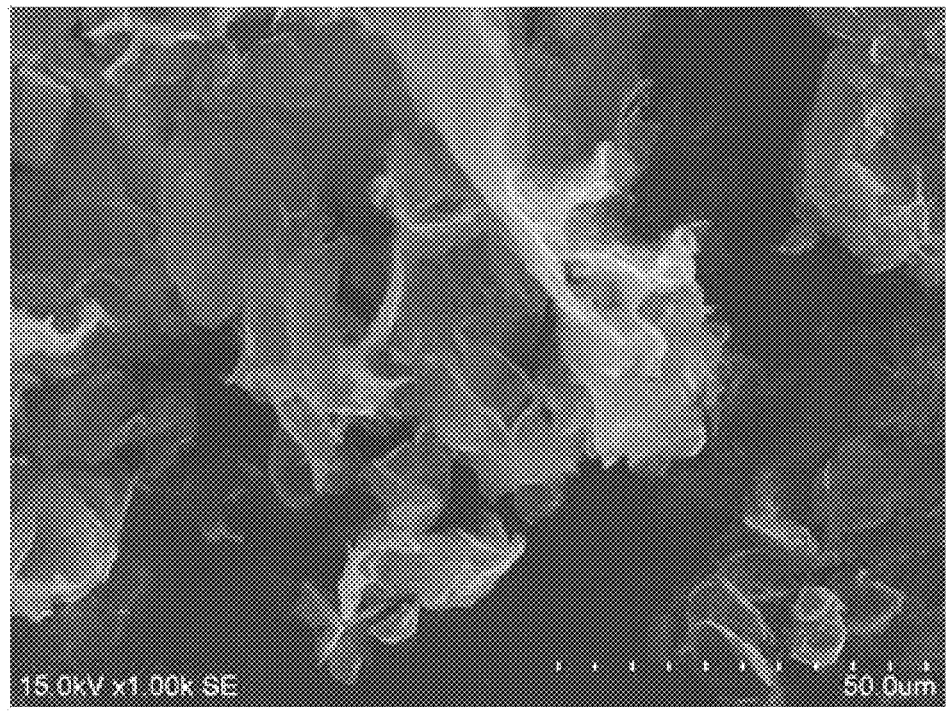
FIG. 6 shows the SEM characterization of the above graphite powders after being liquid-phase sheared at 1000 times magnification.
Figure 7:
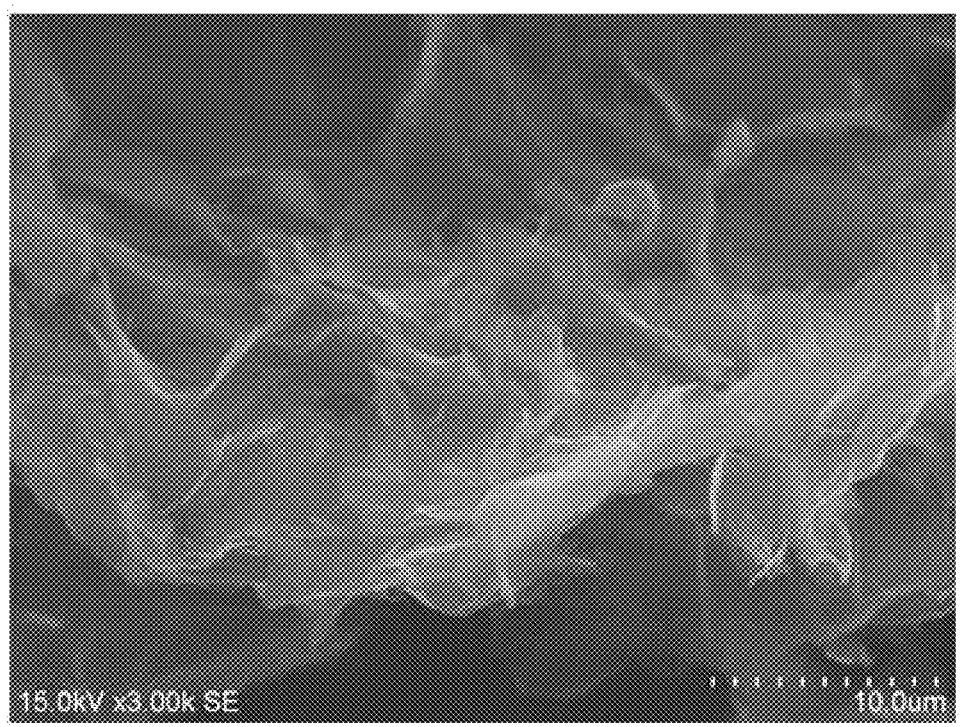
FIG. 7 shows the SEM characterization of the above graphite powders after being liquid-phase sheared at 3000 times magnification.

FIG. 5 shows the SEM (scanning electron microscope) characterization of the 500-mesh graphite powders, and FIGS. 6 and 7 show the SEM characterization of the graphite powders after being liquid-phase sheared.

It is able to be seen from FIG. 6 that in the SEM field of view, almost all graphite powders show the morphology of being sheared and exfoliated. FIG. 7 shows the morphology of graphite powders at higher magnifications, wherein the graphite powders are exfoliated into few-layer graphite and exhibit a typical wrinkled morphology similar to graphene oxide. The preparation process provided by the present invention only uses a small amount of oxidant, which reduces the pressure of environmental protection and achieves the shearing effect beyond sand grinding and rubber grinding compared with the commonly used preparation path of strong acid oxidation. Moreover, the shear product of the preparation process provided by the present invention is quasi-two-dimensional few-layer graphite, which exhibits graphene-like morphological characteristics and has a high yield.

The above is the preferred embodiment of the present invention. It should be pointed out that for those skilled in the art, without departing from the principle of the present invention, several improvements and modifications are able to be made, and these improvements and modifications should also be regarded as falling within the protection scope of the present invention.

What is claimed is:

1. A micro-cavity liquid-phase shearing device for preparing quasi-two-dimensional materials, which comprises a movable plate system, a fixed plate system, a feed liquid external circulation system, a driven gear system and a charging barrel, wherein:

a feed liquid is provided within the charging barrel;
the movable plate system comprises a movable plate unit and a driving gear;
the driven gear system comprises multiple driven gears;
the movable plate unit, which is provided within the charging barrel, comprises a tank and a movable plate around an opening of the tank;
the driving gear is installed within the tank through a driving shaft, the driven gears are engaged with an external side of the driving gear, a lower end of the driving shaft is connected with a power machine, the movable plate unit is fixedly connected with the driving shaft, the driving shaft drives the driving gear and the movable plate unit to rotate;
the fixed plate system comprises a fixed plate unit and a support, wherein the support is installed above the charging barrel, the fixed plate unit is provided under the support, the fixed plate unit comprises an annular fixed plate which is provided above the movable plate in parallel;
the feed liquid external circulation system comprises a microfluidic pump, a discharge pipe and a feed pipe, wherein two ends of the discharge pipe are connected with a liquid discharge port of the charging barrel and a liquid feed port of the microfluidic pump, one end of the feed pipe is connected with a liquid discharge port of the microfluidic pump, another end of the feed pipe is provided above the driving gear;
the tank has a primary shear cavity, an annular micro-gap between the movable plate and the fixed plate is defined as a secondary shear micro-cavity;
the feed liquid, which flows outside the feed pipe through the liquid discharge port thereof, is primarily sheared in the primary shear cavity by the movable plate system, and then is secondarily sheared in the secondary shear micro-cavity by the movable plate and the fixed plate, and then returns to the charging barrel.

2. The micro-cavity liquid-phase shearing device according to claim 1, wherein the fixed plate system further comprises an annular micro-gap adjustment device which comprises multiple fasten screws and multiple precision differential screw devices, wherein two ends of the annular fixed plate after being upwardly bent are connected with the support through the multiple circumferentially evenly distributed fasten screws, upper ends of the multiple fasten screws extend outside the support and are connected with the precision differential screw devices respectively.

3. The micro-cavity liquid-phase shearing device according to claim 2, wherein multiple capacitance micro-ranging devices are inserted into a lower end surface of the annular fixed plate.

4. The micro-cavity liquid-phase shearing device according to claim 3, wherein the multiple capacitance micro-ranging devices are circumferentially evenly distributed at the fixed plate.

5. The micro-cavity liquid-phase shearing device according to claim 1, wherein three circumferentially evenly distributed driven gears are engaged with the external side of the driving gear.

6. The micro-cavity liquid-phase shearing device according to claim 5, wherein the three driven gears are sleeved on a lower end of three driven shafts respectively, the three driven shafts are limited to the support through bearings.

7. The micro-cavity liquid-phase shearing device according to claim 5, wherein the three driven gears are sleeved on a lower end of three driven shafts respectively, the three driven shafts are limited to the support through bearings.

8. The micro-cavity liquid-phase shearing device according to claim 1, wherein the power machine is a high-speed motor, the lower end of the driving shaft extends outside a bottom of the charging barrel and is connected with a motor shaft of the high-speed motor.

9. The micro-cavity liquid-phase shearing device according to claim 8, wherein a protruding portion is provided at the bottom of the charging barrel, and a bearing support is provided between the driving shaft and a side wall of the protruding portion.

10. The micro-cavity liquid-phase shearing device according to claim 1, wherein the support is fixedly connected with an upper end of the charging barrel through a fixing bolt set.

* * * * *